United States Patent [19]

Blythe

[11] Patent Number: 4,998,995

[45] Date of Patent: Mar. 12, 1991

[54] AIRCRAFT OF SPLIT TURBO-PROP CONFIGURATION

[75] Inventor: Alan A. Blythe, Hatfield, England

[73] Assignee: British Aerospace Public Limited Company, London, England

[21] Appl. No.: 347,137

[22] Filed: May 4, 1989

[30] Foreign Application Priority Data

May 5, 1988 [GB] United Kingdom ............... 8810616

[51] Int. Cl.⁵ .............................................. B64D 27/00
[52] U.S. Cl. .................................. 244/55; 244/53 R; 244/54
[58] Field of Search .................... 244/54, 55, 65, 53 R

[56] References Cited

U.S. PATENT DOCUMENTS

| 2,153,603 | 4/1939 | Wells | 244/55 |
| 2,162,956 | 6/1939 | Lysholm | 244/53 R |
| 2,388,806 | 11/1945 | Stalker | 244/53 R |
| 2,426,635 | 9/1947 | Mercier | 244/53 R |
| 2,526,941 | 10/1950 | Fishbein | 244/53 R |

FOREIGN PATENT DOCUMENTS

| 489796 | 1/1930 | Fed. Rep. of Germany | 244/55 |
| 880101 | 4/1953 | Fed. Rep. of Germany | 244/55 |
| 1109533 | 6/1961 | Fed. Rep. of Germany | 244/55 |
| 621606 | 4/1949 | United Kingdom | 244/55 |
| 621607 | 4/1949 | United Kingdom | 244/55 |

Primary Examiner—Joseph F. Peters, Jr.
Assistant Examiner—Christopher P. Ellis
Attorney, Agent, or Firm—Cushman, Darby & Cushman

[57] ABSTRACT

A turbo-prop driven aircraft has the engines (6) and propeller assemblies (10) spatially separated fore and aft of the wing box (4) and interconnected by a drive shaft (27). This arrangement permits the engine to be located away from the wing box without causing excessive overhang of the turbo-prop installation.

9 Claims, 2 Drawing Sheets

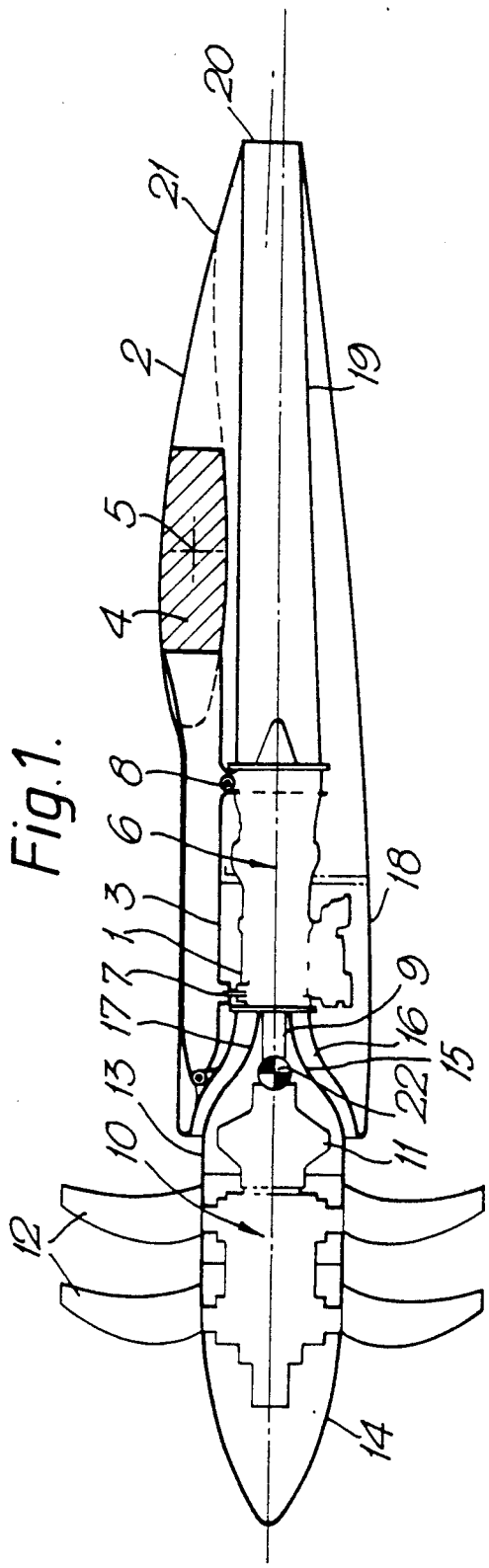
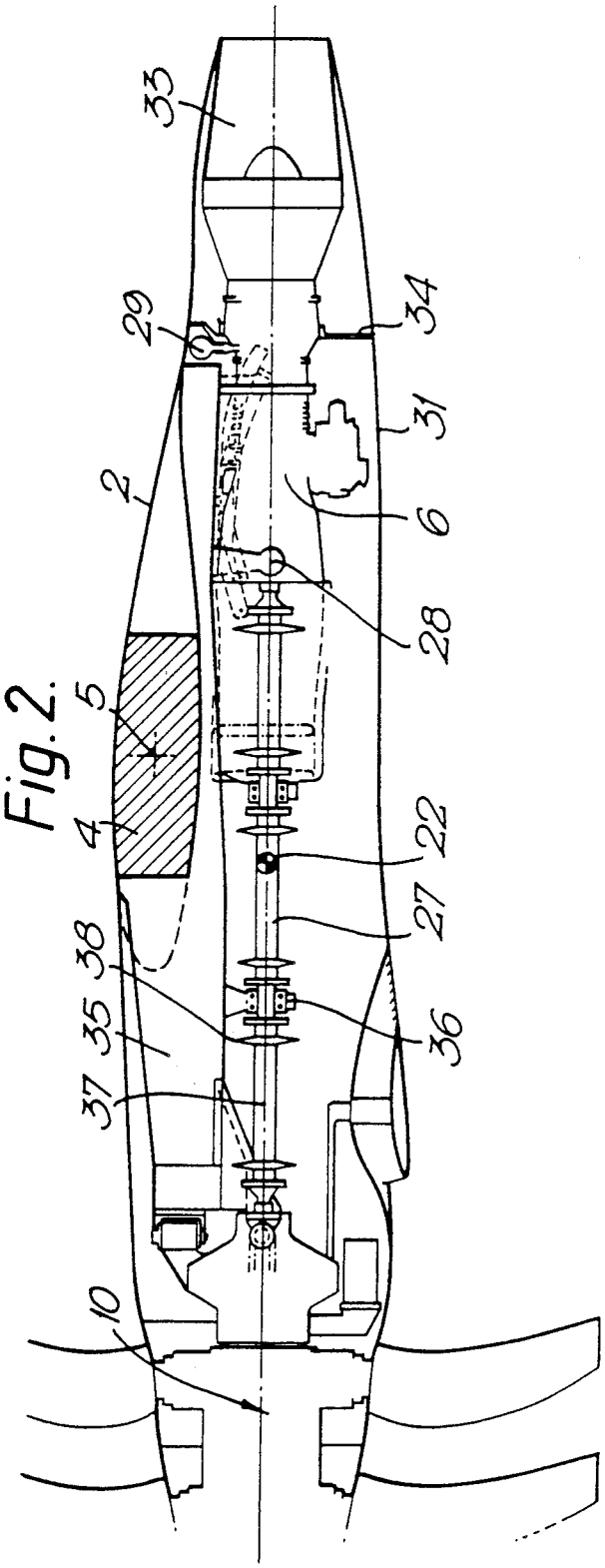

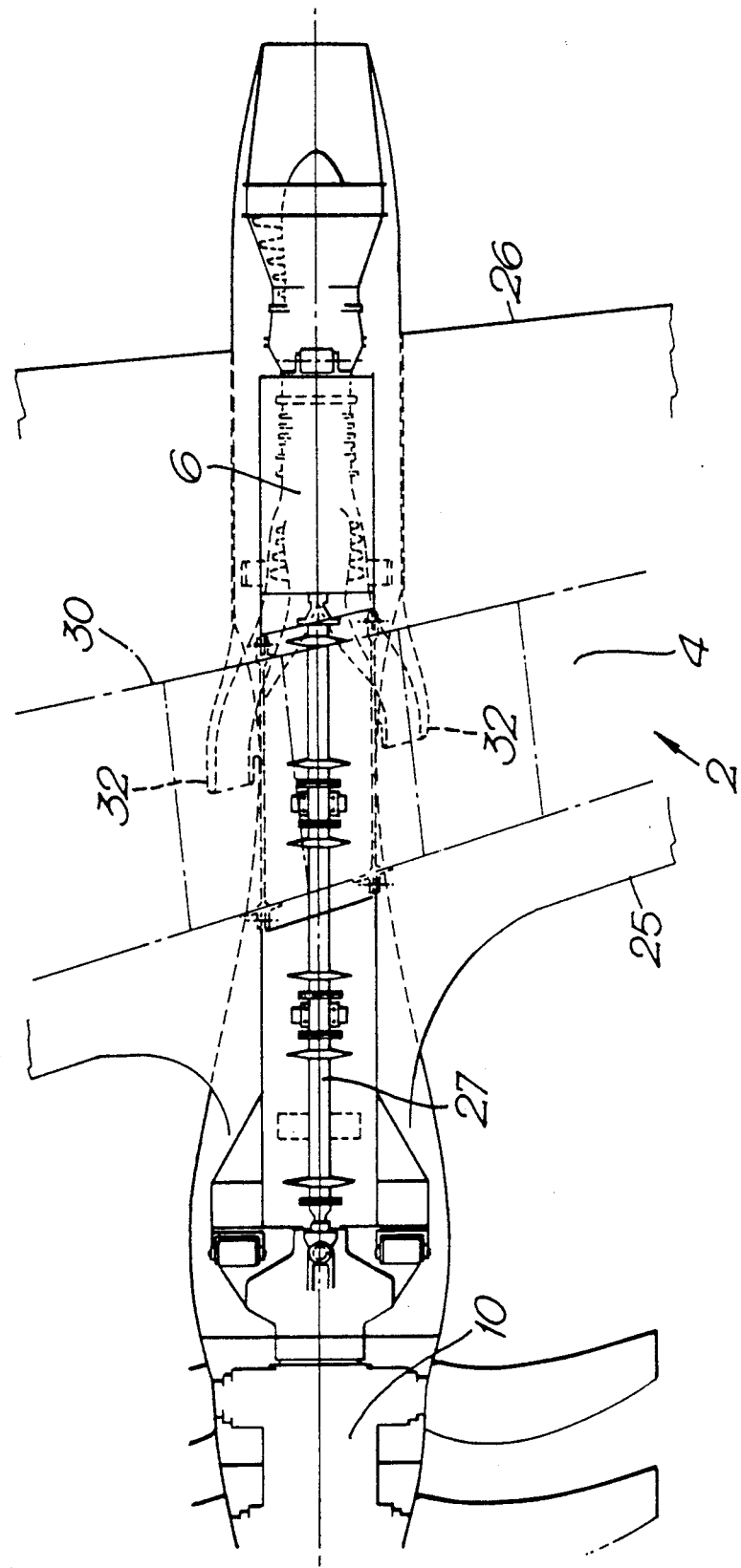

AIRCRAFT OF SPLIT TURBO-PROP CONFIGURATION

BACKGROUND OF THE INVENTION

1. Field of the Invention

This invention relates to turbo-prop powered aircraft.

2. Description of the Prior Art

Conventional wing mounted turbo-prop installations require that powerplants be located in such a way as to minimize the risk of debris, resulting from an uncontained rotor failure for example, penetrating the structural wing box or catastrophically damaging wing attachments. In addition, engine combustion chambers should not be located adjacent to fuel tanks. As a consequence of these requirements wing mounted turbo-prop installations are generally arranged such that all rotating parts are located ahead of the wing leading edge. However, such arrangements may result in excessive overhang and potential flutter problems and would be particularly so in the case of an aircraft powered by contra-rotating propellers where the ratio of overhang to local structural wing box chord is high. It is the object of the present invention to provide an aircraft configuration to overcome these various shortcomings.

GB-A-621,606 and GB-A-621,607 disclose an engine arrangement in which the core engine is separated from the propeller assembly and connected thereto by means of an extended drive shaft. In this arrangement, however, the engines are located in recesses formed within the structural wing box which as already stated is undesirable, with the propeller assembly being a pusher propeller located behind the wing, and this arrangement does not meet the required safety standards in the event of a catastrophic engine failure.

SUMMARY OF THE INVENTION

According to the present invention there is provided an aircraft including at least two wing-mounted turbo-prop powerplant installations, each wing including a spanwise extending structural wing box, a leading edge portion, and a trailing edge portion, each said turbo-prop including a gearbox/propeller assembly and said engine being spatially separated in fore and aft alignment with respect to said wing, characterised in that said engine is displaced away from said wing box. By means of this arrangement the engine is located safely away from the wing box without generating an undesirable overhang.

Preferably the fore and aft location of the separated engine and gearbox/propeller assemblies is such that the center of gravity of each powerplant installation is beneficially located in the vicinity of the wing flexural axis.

For ease of access for maintenance each powerplant installation may be suspended beneath the wing, and the whole installation may be housed within an integrated nacelle assembly including an air intake for the supply of intake air to the gas turbine engine. The drive shaft mans may be a single extended drive shaft, but preferably comprises a plurality of draft shaft elements interconnected by means of flexible couplings. This arrangement allows for slight misalignments or relative motion that may occur between the engine and gearbox/propeller assembly.

In a particularly preferred embodiment the engines are mounted rearwardly of the wing box, and the gearbox/propeller assembly is mounted forwardly of the wing box.

BRIEF DESCRIPTION OF THE DRAWING

One embodiment of the invention will now be described, by way of example, only, and with reference to the following drawings in which:

FIg. 1 illustrates, in diagrammatic side elevation, a conventional turbo-prop installation;

FIG. 2 illustrates, in diagrammatic side elevation, a split turbo-prop configuration in accordance with the present invention; and, FIG. 3 illustrates, in partial plan view, a portion of aircraft of split turbo-prop configuration in accordance with the present invention.

DETAILED DESCRIPTION OF THE PRESENTLY PREFERRED EXEMPLARY EMBODIMENT

Referring to the drawings, FIg. 1 illustrates a conventional turbo-prop installation 1 mounted forwardly of a wing 2 by means of an engine mounting beam 3 extending forwardly of a structural wing box 4. The flexural axis of the wing is indicated at 5. The turbo-prop installation 1 comprises a core engine 6, having fore and aft attachments 7 and 8 respectively to the engine mounting beam 3, interconnected by a short length of drive shaft 9 to a propeller/gearbox assembly 10 comprising a gearbox 11 driving a pair of contra-rotating propellers 12. The gearbox is contained within a center body 13 co-axial with a propeller boss 14. The rearwardly convergent surface 15 of the center body 13 forms the inner profile of an annular air intake duct 16 whose outer profile 17 is formed as an integral part of the integrated engine nacelle 18 for the supply of intake air to the core engine 6. The nacelle extends rearwardly as shown and includes an integral jet pipe 19 terminating in a thrust nozzle 20 rearward of the wing trailing edge 21. The overall powerplant assemblies center of gravity is indicated at 22.

The excessive overhang of the powerplant assembly in this conventional turbo-prop installation is clearly illustrated in FIG. 1. The significant moment arm of this arrangement, in addition to its potential flutter problem, may result in excessive and unacceptable structure weight which will be further exacerbated by the need for the integrated nacelle 18 to extend aft of the wing 2 in order to reduce interference drag. The need to locate turbine discs ahead of the wing structural box 4 could necessitate an even greater increase in overhang in aircraft having wings of increased leading edge sweep. A further shortcoming in a conventional turbo-prop installation is the constraint which this imposes on engine air intake design because of the need to minimize, as far as possible, propeller overhang.

Reference to now made to FIGS. 2 and 3 and in which, for clarity, parts which are common with those of FIG. 1 have common reference numbers. FIG. 3 illustrates in partial plan view a portion of an aircraft wing incorporated a turbo-prop powerplant configuration in accordance with the present invention and which may best be described as a split turbo-prop configuration. It will be understood that although only a single turbo-prop installation is illustrated for the purposes of description, this represents a twin engined aircraft configuration, it is also equally applicable to four engine configurations. Furthermore, the present invention, although specifically described in the context of a contra-rotating propeller installation, is equally applicable to single bladed propellers and may be beneficially relevant to aircraft of moderate wing leading edge sweep as illustrated or to more highly swept configurations.

In FIG. 3 there is shown a portion of a wing 2 having a leading edge 25 and a trailing edge 26 both of moderate sweep back. The wing incorporates a structural wing box 4, shown in broken line. For convenience, only the port or left hand wing is illustrated. Referring to FIG. 2 in conjunction with FIG. 3 the aircraft of split engine configuration includes a core engine 6 positioned rearwards or aft of the wing box 4 and the propeller/gearbox assembly 10 well forwards of the wing box driven by a high speed (engine rpm) drive shaft 27. By this arrangement potential debris paths from the propellers (or rotors) and core engine turbines are well clear of the structural wing box and the overall powerplant center of gravity 22 is located in a favorable position just ahead of the wing flexural axis 5 minimizing the possibility of wing flutter with an associated reduction in structural weight.

The gearbox/propeller assembly 10 is supported on a wing pylon 35 giving a considerably reduced moment arm over the arrangement of FIG. 1 thereby increasing the stiffness of the gearbox/propeller installation and minimizing induced vibration problems. This arrangement furthermore provides freedom to locate propellers in a position to provide minimum interface clearance with respect to the wing for aerodynamic reasons.

The core engine 6 is supported off the structural wing box 4 by means of fore and aft attachments 28 and 29 respectively, the main attachment 28 positioned comparatively close to the wing box rear spar 30, the rear attachment 29 catering only for nodding loads.

The drive shaft 27 is supported at a number of points along its length from the wing pylon 35 by means of bearings 36. The drive shaft 27 itself comprises a series of separate drive shaft elements 37 interconnected by means of flexible couplings 38. This drive shaft construction allows for any slight misalignments that may be caused by manufacturing tolerances or induced flight loads and vibrations, and provides improved installation.

The split turbo-prop installation is contained within an integrated nacelle 31 incorporating engine air intakes 32 disposed in front of the engine 6 on either side of the drive shaft 27, and the nacelle is 'area ruled' to reduce drag at high speeds. The split engine concept provides available space in the vicinity of the air intake enabling more flexibility in intake design than hitherto and a consequent benefit from ram from the propeller slipstream. The clearly defined fire zone 33 is positioned well downstream of the wing box 4 and therefore the fuel tank, and is separated by means of a firewall 34.

There are numerous other benefits evident from use of the split powerplant configuration. For example:

(a) Parts of the nacelle can be constructed from lightweight composite and may include modular construction.

(b) Splined connections can be used to enable propellers or propeller/gearbox assembly 10 and the core engine 6 to be removed and assembled independently.

(c) Provision of a lighter more rigid installation than a forward located turbo-prop installation, as exemplified in FIG. 1, with potential for reducing interference drag, at a lower risk by removing uncertainties associated with flutter.

(d) The configuration of the present invention is achieved without degrading the potential significant fuel saving benefits of open rotors.

I claim:

1. An aircraft including at least two wing mounted turbo-prop powerplant installations, each wing including a spanwise extending structural wingbox, a leading edge portion and a trailing edge portion, each of said turbo-prop powerplant installations including:
a gear box/propeller assembly;
a gas turbine engine; and
interconnecting drive shaft means;
said turbo-prop powerplant installations extending longitudinally beneath said wing with said gear box/propeller assembly and said gas turbine engine being spatially separated in fore and aft alignment with respect to said wing and at least said gas turbine engine being displaced apart from said structural wing box, the arrangement being such that in event of disintegration within the gas turbine engine, the risk of serious or catastrophic wing structural damage or failure is minimized.

2. An aircraft according to claim 1, wherein said interconnecting drive shaft means is rotatably supported at least at one point along its length.

3. An aircraft according to claim 1 or 2, wherein each said drive shaft means comprises a plurality of drive shaft elements interconnected by means of flexible couplings.

4. An aircraft according to claim 1 or 2, wherein each said turbo-prop powerplant installation is housed within an integrated nacelle assembly including air intake means for supplying of intake air to the gas turbine engine.

5. An aircraft according to claim 3, wherein each said turbo-prop powerplant installation is housed within an integrated nacelle assembly including air intake means for supplying of intake air to the gas turbine engine.

6. An aircraft according to claim 1 or 2, wherein the engines are mounted rearwardly of said wing box and said gearbox/propeller assemblies are mounted forwardly of the wing box.

7. An aircraft according to claim 3, wherein the engines are mounted rearwardly of said wing box and said gearbox/propeller assemblies are mounted forwardly of the wing box.

8. Air aircraft according to claim 4, wherein the engines are mounted rearwardly of said wing box and said gearbox/propeller assemblies are mounted forwardly of the wing box.

9. An aircraft according to claim 5, wherein the engines are mounted rearwardly of said wing box and said gearbox/propeller assemblies are mounted forwardly of the wing box.

* * * * *